US010114436B2

(12) United States Patent
York

(10) Patent No.: US 10,114,436 B2
(45) Date of Patent: Oct. 30, 2018

(54) AUX POWER CONTROLLER

(71) Applicant: HEWLETT PACKARD ENTERPRISE DEVELOPMENT LP, Houston, TX (US)

(72) Inventor: Justin E York, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 26 days.

(21) Appl. No.: 14/784,874

(22) PCT Filed: May 29, 2013

(86) PCT No.: PCT/US2013/043157
§ 371 (c)(1),
(2) Date: Oct. 15, 2015

(87) PCT Pub. No.: WO2014/193369
PCT Pub. Date: Dec. 4, 2014

(65) Prior Publication Data
US 2016/0062433 A1 Mar. 3, 2016

(51) Int. Cl.
*G06F 1/32* (2006.01)
*G06F 1/26* (2006.01)
*G06F 13/40* (2006.01)

(52) U.S. Cl.
CPC ............ *G06F 1/266* (2013.01); *G06F 1/3287* (2013.01); *G06F 1/3296* (2013.01); *G06F 13/4068* (2013.01); *Y02D 10/151* (2018.01); *Y02D 10/171* (2018.01); *Y02D 10/172* (2018.01)

(58) Field of Classification Search
CPC .............................. G06F 1/3281; G06F 1/3287
See application file for complete search history.

(56) References Cited

U.S. PATENT DOCUMENTS

| 5,831,346 | A | 11/1998 | Baumann et al. |
| 5,930,496 | A | 7/1999 | Maclaren et al. |
| 6,381,636 | B1 | 4/2002 | Cromer et al. |
| 7,725,632 | B2 | 5/2010 | Baba et al. |
| 8,107,256 | B1 | 7/2012 | Kondrat et al. |
| 8,230,149 | B1* | 7/2012 | Long ...................... G06F 21/85 710/305 |
| 2008/0313476 | A1 | 12/2008 | Hansen |
| 2009/0150702 | A1* | 6/2009 | Pickholz ............... G06F 1/3203 713/330 |

(Continued)

FOREIGN PATENT DOCUMENTS

CN 201348781 Y 11/2009
EP 0724208 7/1996

OTHER PUBLICATIONS

"Sun Fire™ V20z and V40z Server Architectures," <http://people.ee.ethz.ch/~ballisti/computer...topics/docs/SUN...Fire...V20z...AMD-white ..paper.pdf>, Jul. 2004, 40 pps.

(Continued)

*Primary Examiner* — Albert Wang
(74) *Attorney, Agent, or Firm* — Hewlett Packard Enterprise Patent Department

(57) ABSTRACT

A computing device including an AUX (auxiliary) power controller connected to the expansion slot to supply aux power to the expansion slot intermittently based on instructions from a baseboard management controllers (BMC).

14 Claims, 5 Drawing Sheets

(56) References Cited

U.S. PATENT DOCUMENTS

| | | | |
|---|---|---|---|
| 2010/0106987 A1* | 4/2010 | Lambert | G06F 1/3203 |
| | | | 713/320 |
| 2010/0169530 A1 | 7/2010 | Guo | |
| 2011/0304966 A1 | 12/2011 | Schrempp | |
| 2013/0042019 A1 | 2/2013 | Galles et al. | |
| 2014/0006676 A1* | 1/2014 | Chandrasekhar | G06F 13/36 |
| | | | 710/316 |
| 2016/0234095 A1* | 8/2016 | Shetty | H04L 45/02 |

OTHER PUBLICATIONS

International Search Report and Written Opinion received in PCT Application No. PCT/US2013/043157, dated Feb. 25, 2014, 11 pgs.
Chinese Office Action cited in Appl. No. 201380076951.0 dated Apr. 25, 2017; 9 pages.

\* cited by examiner

AUX POWER CONTROLLER

BACKGROUND

A computing system may implement the Advanced Configuration and Power Interface (ACPI) specification of another power management system. A power management system may include different power states such as a working state, a soft off state and a mechanical off state. In the working state the processor of the computing device can execute instructions. In the mechanical off state a power supply is not supplying any power to the computing device.

BRIEF DESCRIPTION OF THE DRAWINGS

Some implementations are described with respect to the following figures.

DETAILED DESCRIPTION

Figure 1:
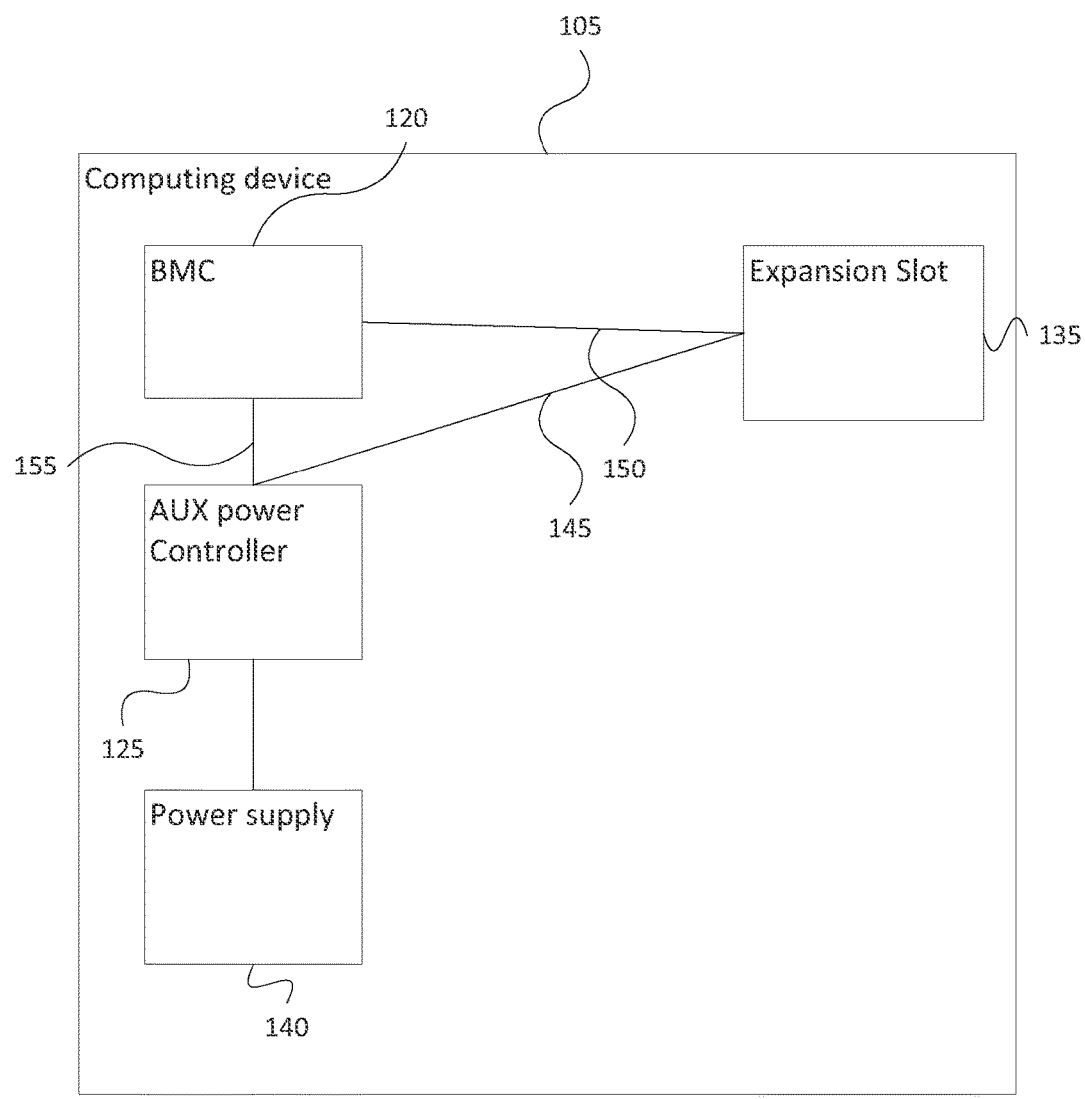
FIG. 1 is a block diagram of a computing device according to an example implementation.

Systems and network virtualization are common in the datacenter. Virtualization techniques allow a workload to be relocated anywhere in the world. Both system and network performance can be adjusted dynamically to allow for the best workload performance while also making best collective use of resources.

Virtual workload relocation requires a precise understanding of the physical infrastructure. This includes understanding both system resources (such as servers) and network resources (such as network switches). It also includes the physical connectivity between the two. Because, ideally, a system will stay powered off when no workloads are assigned to it, understanding physical topology of the system and network while the server is powered off is very important in enabling eventual workload assignment to that system.

Servers often have an "auxiliary" (aka "AUX") power bar that operates at a low level and provides power to baseboard management controllers (BMCs) and a limited set of server resources. This AUX power system is extremely limited. The requirement to power more of the server using the AUX power subsystem to enable learning both system inventory and network topology is exceeding the power available under AUX.

A power supply can supply system power and AUX (auxiliary) power to a computing system. System power may be supplied by the power supply when the computing device is in a working state of its power management system. The AUX power may be supplied in a soft off state of the computing device. The AUX power may be supplied to some resources but not all resources of the computing device. For example the baseboard management controllers (BMC) may be supplied with AUX power. The AUX power may be used to determine device inventory but to turn all the systems that inventory is needed may exceed the power available by the AUX power. Government regulations are also reducing the amount of power that can be drawn in a low power state of a device. For example by 2013 regulations may cause a computing device to draw no more than 0.5 watts in a standby state. The standby state is an example of a low power device state.

A computing device may want to determine whether expansion cards are present. If there are expansion cards the computing device may want to maintain a connection enabled by the expansion card. For example if there is a Network interface card (NIC) in the expansion slot the computing device may want to enable the NIC to notify a network switch of the presence of the NIC and therefore the computing device. The system may also want to allow the computing device to enable features in a low power state such as Wake on Lan.

In one implementation, a computing device can have an expansion slot and a baseboard management controller (BMC) connected to the expansion slot. A power supply can supply AUX power in a low power device state to the expansion slot. An AUX power controller connected to the expansion slot can supply AUX power to the expansion slot intermittently based on instructions from the BMC.

In another implementation, a computing device can have a BMC connected to an expansion slot to send instructions to an expansion card in the expansion slot. An AUX power controller connected to the expansion slot can supply AUX power to the expansion slot intermittently.

In another implementation, a non-transitory computer readable medium can have code that if executed by a BMC in a computing device can cause the BMC to intermittently signal an AUX power controller connected to the expansion slot to supply AUX power to the expansion slot. The BMC can determine a type of expansion card and the BMC can send an instruction to the expansion card.

With reference to the figures, FIG. 1 is a block diagram of a computing device according to an example implementation. A computing device 105 can have an expansion slot 135 and a baseboard management controller (BMC) 120 connected to the expansion slot 135. The expansion slot may be for example a PCIe (Peripheral Component Interconnect Express), PCI (Peripheral Component Interconnect), PCI-x (Peripheral Component Interconnect eXtended), AGP (Accelerated Graphics Port) or another type of expansion slot. A BMC may be a RISC (reduced instruction set computing) processor, an ASIC (application specific integrated circuit) or another type of integrated circuit. The BMC can manage the interface between system management software and platform hardware. Different types of sensors built into the computer system report to the BMC on parameters such as temperature, cooling fan speeds, power status, operating system (OS) status, etc. An administrator can also remotely communicate with the BMC to take some corrective action such as resetting or power cycling the system to get a hung OS running again.

The BMC is part of The Intelligent Platform Management Interface (IPMI) which is a computer system interface used by system administrators for out-of-band management of computer systems and monitoring of their operation. Out of band means independently of the operating system.

A power supply 140 can supply AUX power in a low power device state to the expansion slot 135. The power supply may also supply system power to the device. When system power is off and only AUX power is being supplied the amount of resources that can be powered is limited, for example if AUX power cannot exceed 0.5 watts then an expansion slot may not be powered continuously.

If the expansion slot is not powered continuously then the BMC may want to power the expansion slot intermittently to take inventory of the computing device or to send an instruction to an expansion card in the slot.

The BMC can send an instruction to an AUX power controller 125 connected to the expansion slot 135 to supply AUX power to the expansion slot intermittently. Intermittently can mean that when the BMC determines that the inventory needs to be determined the BMC can cause the AUX power controller 125 to power the expansion slot. The BMC may take inventory on a schedule for example after a specified amount of time has passed since the last inventory the BMC may want to update the inventory of the system without exceeding the AUX power. The AUX power may also be determined over a period of time. For example, if the AUX power is supplied to an expansion slot that draws 0.5 watts and the BMC inventories the slot, the BMC may send an instruction to the expansion card in the slot, if an expansion card is found. If the instruction or inventory took a period of time such as 15 seconds to complete, the BMC may cause the AUX power controller to discontinue AUX power to the expansion card and may leave the power off for a period such as 45 seconds before another inventory, then the average power drawn over the 60 seconds is less than 0.5 watts.

Intermittently may mean a regular repeating supply of power or may mean an irregular repeating supply of power. For example the BMC may cause the AUX power to be supplied regularly every 60 seconds or the BMC may cause the AUX power to be supplied based on other events such as if the computing device has multiple expansion slots a slot may have AUX power cycled to it based on the number of expansion cards that are connected to the expansion slots, such as if the computing device has 3 expansion slots and 2 expansion cards, then each of the cards may be cycled on when the other card has completed an instruction or inventory has been taken and the AUX power is discontinued to the expansion card.

The BMC may connect to the AUX power controller through an I²C bus (inter integrated circuit bus) 155. The BMC may send and/or receive instructions to the expansion slot 135 through the I²C bus 150. The AUX power controller may supply AUX power through connection 145.

Figure 2:
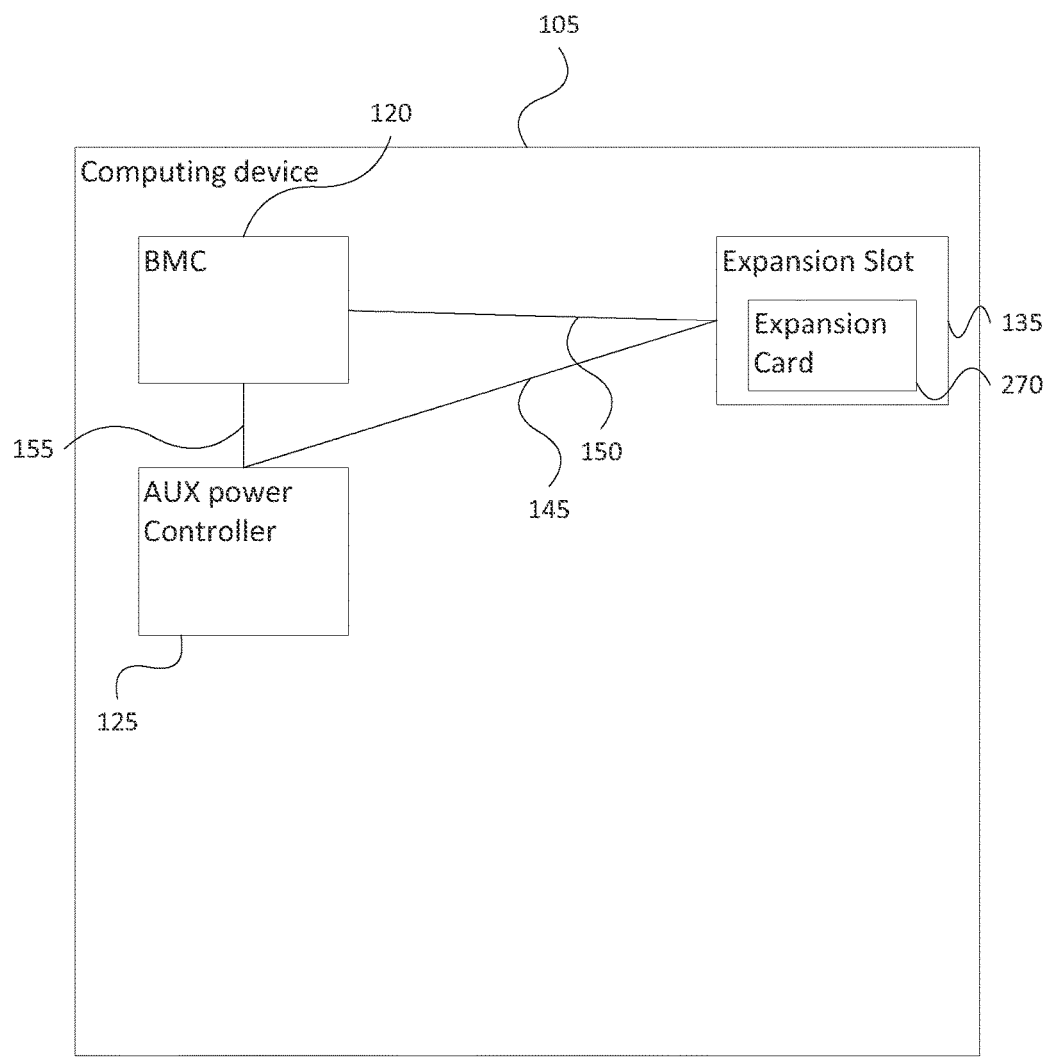
FIG. 2 is a block diagram of a computing device according to an example implementation.

FIG. 2 is a block diagram of a computing device according to an example implementation. A computing device 105 can have a BMC connected to an expansion slot 135 to send instructions to an expansion card 270 in the expansion slot 135. The instructions that the BMC may send to the expansion card may depend on the type of expansion card. For example if the expansion card is a network interface card (NIC) the BMC may send and instruction to the NIC to perform a task and the NIC completes the task without additional instruction from the BMC and may report back to the BMC when the task is complete. An expansion card may respond complete when the instruction has been executed or may send another type of response to the BMC. In another example the BMC may send more specific instructions to the expansion card to complete its task. An example of the task may be to announce the presence of the NIC to a network, and the NIC may know how to do that and only be told by the BMC to complete the task or the NIC may need to be told by the BMC how to complete the task. A NIC for example may respond to the BMC with information obtained by the NIC when the NIC announced the presence on a network.

An AUX power controller connected to the expansion slot can supply AUX power to the expansion slot intermittently. The AUX power controller may supply power to the expansion slot based on instruction from the BMC.

Figure 3:
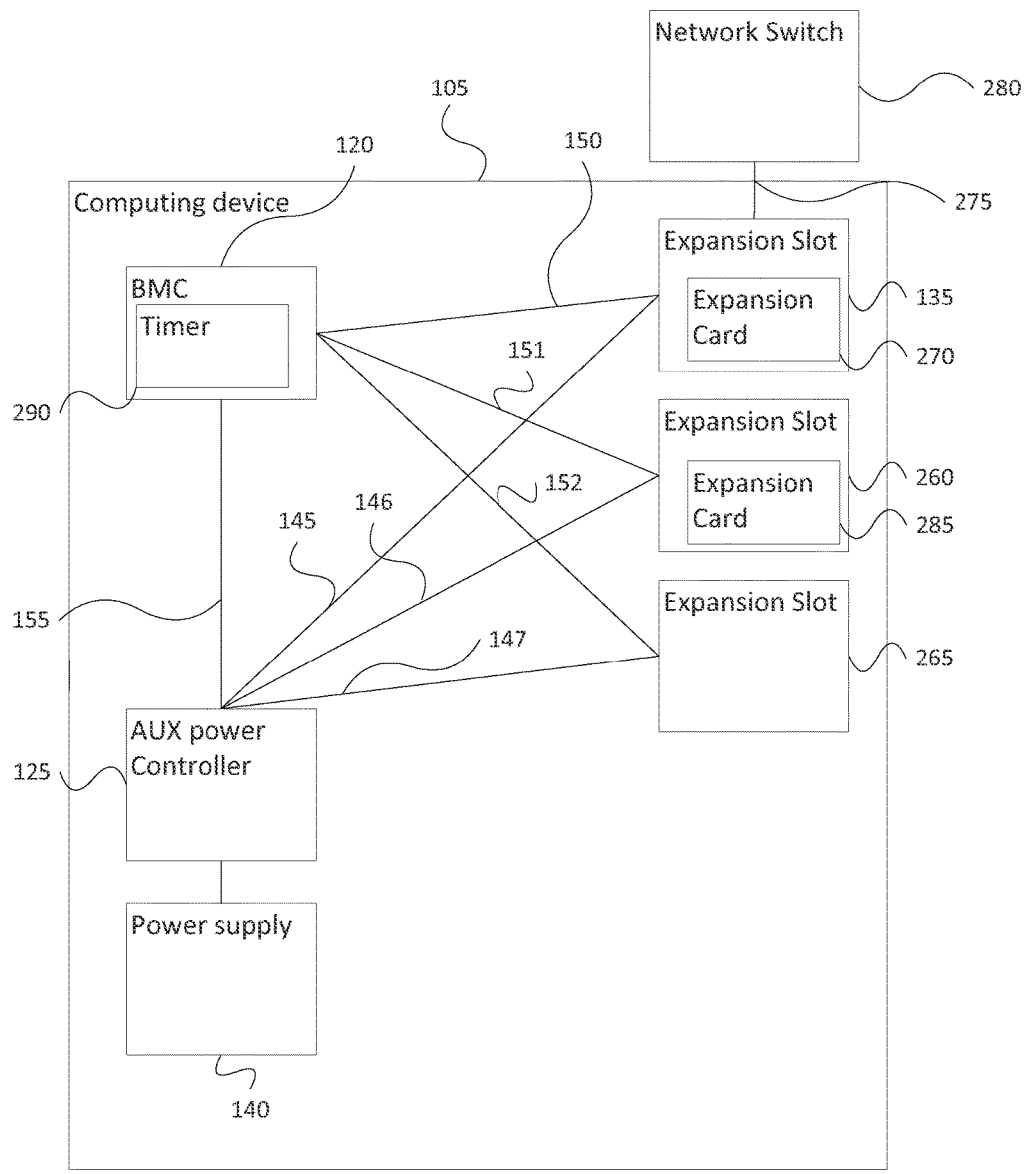
FIG. 3 is a block diagram of a computing device according to an example implementation.

FIG. 3 is a block diagram of a computing device according to an example implementation. In one implementation, the BMC 120 is receiving AUX power. In the initial state, all expansion slots 135, 260, 265 are powered off by the AUX power controller 125. While the system remains in an AUX power state (system is in a low power state), the BMC uses I2C 155 to send a command to the AUX power controller 125 to power on Expansion Slot 135 by enabling AUX power rail 145. After a brief initialization delay, the BMC 120 can now send a command over I2C 150 to any potential occupant of expansion slot 135 to ask for inventory information. NIC 270 occupies expansion slot 135. NIC 270 sends information to the BMC describing itself as a NIC. NIC 270 can also establish a network connection to Network Switch 280 through Network Cable 275. NIC 270 may exchange topology information using a mechanism such as the link-layer discovery protocol. The result of this topology exchange is that both Network Switch 280 and NIC 270 have knowledge that they are connected to each other. NIC 270 will then send the connection topology information to BMC 120 for updating any inventory and topology tables. At this time, BMC 120 understands the inventory of expansion slot 135 and knows the network topology of NIC 270. BMC 120 can power off NIC 270 by having the AUX power controller 125 on I2C 155 remove power from Expansion Slot 135.

The BMC can enable second Expansion slot 260 and NIC 285 sending commands over I2C 151 and enabling the AUX power rail 146. BMC 120 queries NIC 285 over I2C 151 and learns what type of device it is. NIC 285 tries to do learn its network topology of Network Cable attached to the NIC 285, but Network Cable is disconnected. NIC 285 sends an I2C topology update to BMC 120 over I2C 151 indicating that it is not connected to the network. BMC 120 updates its inventory and topology tables for second Expansion Slot 260/NIC 285 and then tells the AUX power controller 125 on I2C 155 to power off second Expansion Slot 260.

The AUX power controller 125 can then power third Expansion slot 265 through AUX power rail 147. The BMC 120 can then send a query over I2C 152 but does not receive a response because no device is present. Due to presence pins, this design can be optimized to not power on third expansion slot 265 so long as it is empty. Once an AUX power sweep of all expansion slots is complete, the inventory can be repeated. BMC 120 can update its inventory and topology tables to reflect the current state of each device in the expansion slots. As changes occur, the BMC 120 may take action such as notifying an external manager by way of an SNMP trap or other network protocol. In some implementations the expansion slots may be supplied AUX power in sets for example a set of 2 expansion slots may receive AUX power at a time as long as the AUX power is not exceeded.

The Power supply 140 may also supply system power, when system power is supplied the BMC may no longer apply AUX power intermittently to the expansion slots as the expansion slots may all receive power from the system power. The BMC may continue to intermittently turn on an off the expansion slots to update the inventory and for example the network topology when the system power is not supplied and the AUX power is supplied. The system power supplies power for operation of the computing device and in a low power state AUX power is supplied and system power is discontinued.

Although 3 expansion slots and 2 expansion cards are described in this example implementation more or less expansion slots or expansion cards may be used.

The computing device may include a timer 290 to cause the AUX power controller to apply the power the expansion slot intermittently. For example the timer may be part of the BMC and there may be a delay between discontinuing AUX power to expansion slot 260 and enabling AUX power to Expansion slot 135. The delay may be for example 30 seconds.

The computing device can discontinue AUX power to the expansion slot based on event triggers. A second event trigger may enable a reapplication of AUX power to the expansion slot after the discontinuation of AUX power. An event trigger may be for example the response by an expansion card to an instruction from a BMC, loss of AUX power or another event trigger.

Figure 4:
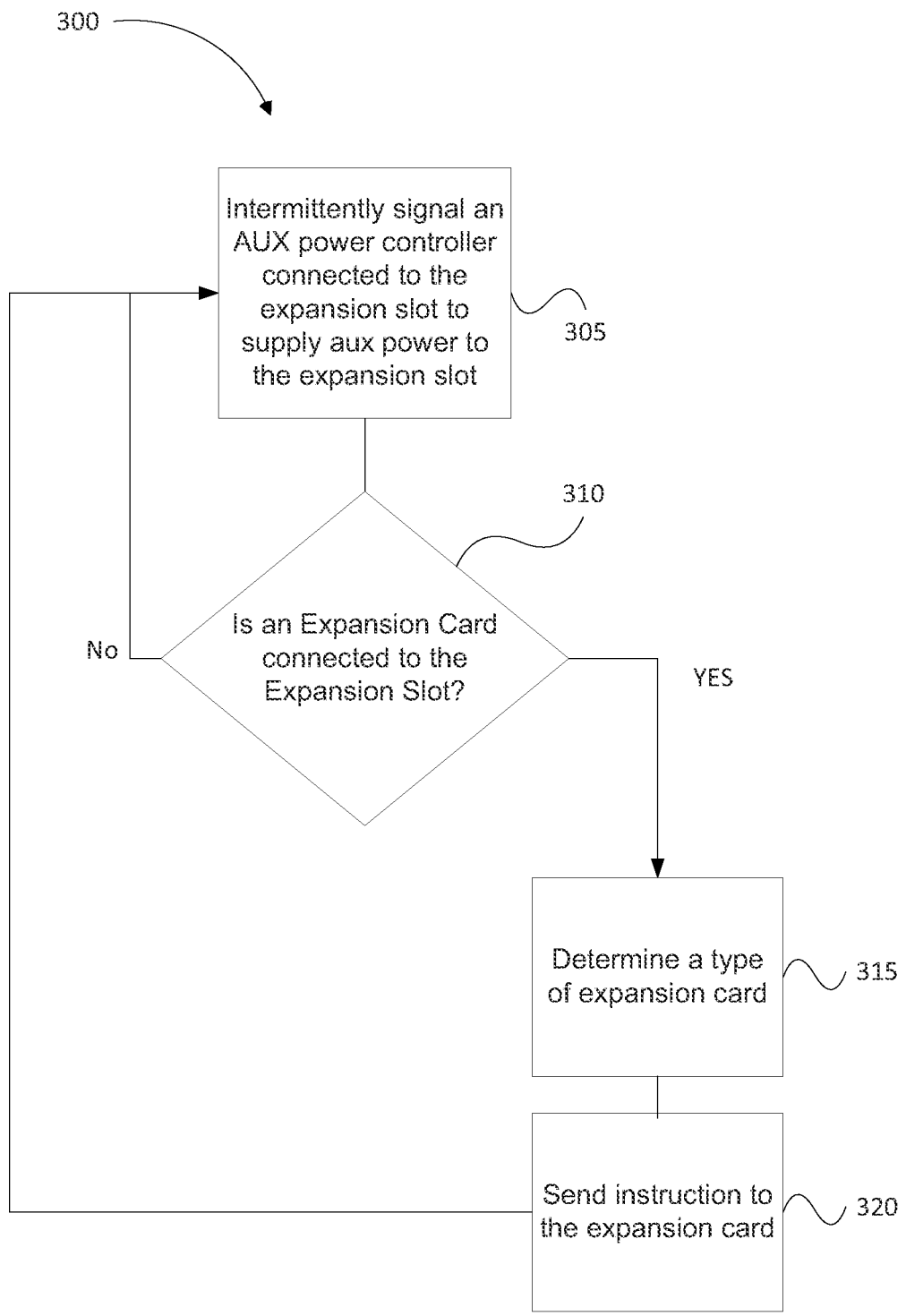
FIG. 4 is a flow diagram of a method of supplying AUX power to an expansion slot according to an example implementation.

FIG. 4 is a flow diagram of a method of supplying AUX power to an expansion slot according to an example implementation. The method 300 can begin by intermittently signaling an AUX power controller connected to the expansion slot to supply aux power to the expansion slot at 305. It can then be determined if an expansion card is connected to the slot at 310. A type of expansion card can be determined at 315. For example the expansion card may be a NIC, a storage adapter for communicated with data storage units or another type of expansion card. Once the inventory is complete and the existence and type of expansion card is known then the BMC can send instruction to the expansion card at 320.

The AUX power supply can discontinue power to the expansion slot after the expansion card has completed the task given by the BMC. The AUX power supply may discontinue power to the expansion slot before applying AUX power to a second expansion slot when there is a second expansion slot.

Figure 5:
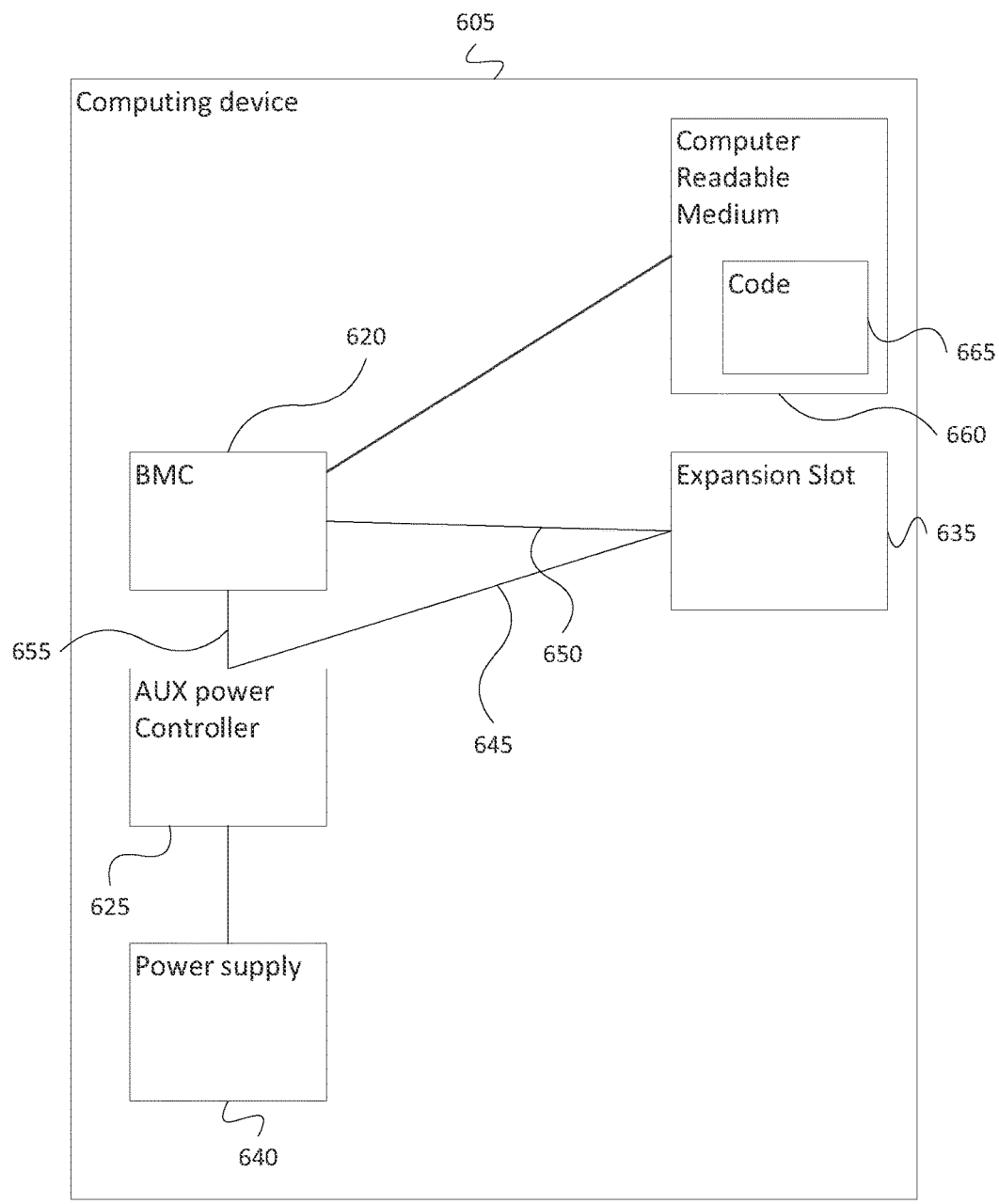
FIG. 5 is a computing device including a computer readable medium according to an example implementation.

FIG. 5 is a computing device including a computer readable medium 660 according to an example implementation. The code 665 if executed by a BMC 620 in a computing device 605 can causes the BMC to intermittently signal through 655 an AUX power controller 625 connected to the expansion slot 635 to supply aux power to the expansion slot 635 over connection 645. The code 665 can cause the BMC 620 to determine a type of expansion card and to send an instruction to the expansion card over connection 650. The computer readable medium 660 code 665 if executed may also cause a computing device to to discontinue power to the expansion slot before applying AUX power to a second expansion slot.

The techniques described above may be embodied in a computer-readable medium for configuring a computing system to execute the method. The computer readable media may include, for example and without limitation, any number of the following non-transitive mediums: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and the Internet, just to name a few. Other new and various types of computer-readable media may be used to store the software modules discussed herein. Computing systems may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing device comprising:
    a first expansion slot;
    a second expansion slot;
    a baseboard management controller (BMC) connected to the first expansion slot and connected to the second expansion slot;
    a power supply to supply AUX power in a low power device state to the first expansion slot; and
    an AUX power controller connected to the first expansion slot to supply AUX power to the first expansion slot intermittently based on instructions from the BMC, and connected to the second expansion slot to supply AUX power to the second expansion slot after discontinuing AUX power to the first expansion slot;
    wherein the BMC is to:
        identify a first expansion card coupled to the first expansion slot when AUX power is supplied to the first expansion slot by the AUX power controller based on instructions from the BMC;
        receive topology information from the first expansion card; and
        instruct the AUX power controller to discontinue AUX power to the first expansion slot in response to receiving the topology information.

2. The device of claim 1, wherein the expansion card is a network interface card (NIC), and wherein the topology information is network topology information that is updated when the NIC is supplied with AUX power.

3. The device of claim 1, further comprising a timer to cause the AUX power controller to apply the power the first expansion slot intermittently.

4. The device of claim 1, wherein the BMC controls the AUX power controller.

5. The device of claim 1, wherein the BMC is to send instructions to perform a task to the first expansion card connected to the first expansion slot when the BMC causes the AUX power controller to supply power to the first expansion slot; and wherein the BMC is to instruct the AUX power controller to discontinue power to the first expansion slot after the first expansion card completes the task.

6. The device of claim 1, further comprising system power, wherein system power supplies power for operation of the computing device and in a low power state AUX power is supplied and system power is discontinued.

7. The device of claim 1, wherein the BMC is to maintain a topology table, send a command to the expansion card to provide topology information; and to update its topology table based on the topology information provided by the expansion card.

8. The device of claim 7, wherein the BMC is connected to a plurality of expansion slots, and is to:
    send instructions to the AUX power controller to supply AUX power to each expansion card sequentially, send inventory instructions to each currently powered expansion card; and update an inventory table and a topology table according responses to the inventory instructions.

9. A computing device comprising:
a BMC connected to a first expansion slot to send instructions to a first expansion card in the first expansion slot and connected to a second expansion slot to send instructions to a second expansion card in the second expansion slot; and
an AUX power controller connected to the first expansion slot to supply AUX power to the first expansion slot intermittently and connected to the second expansion slot to supply AUX power after discontinuing AUX power to the first expansion slot;
wherein the AUX power controller discontinues AUX power to the first expansion slot based on an instruction from the BMC triggered by receiving identification information from the first expansion card.

10. The device of claim 9, wherein a second event triggers a reapplication of AUX power to the first expansion slot after discontinuation of AUX power.

11. A non-transitory computer readable medium comprising code that if executed by a BMC in a computing device causes the BMC to:
intermittently signal an AUX power controller connected to a first expansion slot to supply AUX power to the first expansion slot;
determine a type of expansion card;
send an instruction to the expansion card; and
in response to determining the type of expansion card and sending the instruction, discontinue power to the expansion slot before applying AUX power to a second expansion slot.

12. The computer readable medium of claim 11 further comprising code that if executed causes the BMC to instruct the expansion card to provide inventory and topology information and causes the BMC to update an inventory and topology table with the inventory and topology information.

13. A computing device comprising:
a first expansion slot;
a second expansion slot
a baseboard management controller (BMC) connected to the first expansion slot and the second expansion slot;
a power supply to supply AUX power in a low power device state;
an AUX power controller connected to the first expansion slot and the second expansion slot to supply AUX power to the first expansion slot and the second expansion slot intermittently based on instructions from the BMC; and
a timer to cause the AUX power controller to apply the power to the expansion slot intermittently;
wherein the BMC is to:
identify a first expansion card coupled to the first expansion slot when AUX power is supplied to the first expansion slot by the AUX power controller based on instructions from the BMC; and
instruct the AUX power controller to discontinue AUX power to the first expansion slot in response to identifying the first expansion card.

14. A computing device comprising:
a BMC connected to an expansion slot to send instructions to an expansion card in the expansion slot; and
an AUX power controller connected to the expansion slot to supply AUX power to the expansion slot intermittently;
wherein a response by an expansion card coupled to the expansion slot to an identification query from the BMC triggers a discontinuation of AUX power to the expansion slot, and a expiration of a time sufficient to draw less than a maximum AUX power over a period of time since a preceding application of AUX power triggers a reapplication of AUX power to the expansion slot after the discontinuation of AUX power.

* * * * *